United States Patent [19]

Nolan et al.

[11] Patent Number: 4,716,348
[45] Date of Patent: Dec. 29, 1987

[54] DC MOTOR ADAPTIVE CONTROLLER

[75] Inventors: Dennis C. Nolan, West Allis; David A. Bluma, Milwaukee, both of Wis.

[73] Assignee: MagneTek, Inc., Los Angeles, Calif.

[21] Appl. No.: 900,451

[22] Filed: Aug. 26, 1986

[51] Int. Cl.$^4$ .......................... H02P 5/06; H02P 7/14
[52] U.S. Cl. ................. 318/479; 318/345 E; 318/504; 318/596; 318/809
[58] Field of Search ................ 318/314, 339, 345 E, 318/430, 431, 432, 504, 505, 596, 600, 799, 809, 479

[56] References Cited

U.S. PATENT DOCUMENTS

| | | | |
|---|---|---|---|
| 3,710,086 | 1/1973 | Lahde et al. | 318/596 X |
| 3,944,896 | 3/1976 | Rodek | 318/596 X |
| 4,143,415 | 3/1979 | Klingbeil | 318/596 X |
| 4,451,771 | 5/1984 | Nagase et al. | 318/799 X |
| 4,453,116 | 6/1984 | Bose | 318/809 X |

OTHER PUBLICATIONS

Application note AP-248, Dec. 1985, "Using the 8096" by Ira Horden, Order no. 270061-001, published by Intel Corp.
GEK-45133B Instructions Package Drive System Environment, 5-page document, list of equip. for speed variator drive 680-51909, published by General Electric.
GEK-85765C DC-300 Adjustable Speed Drives Installation Operation and Maintenance Instructions, pp. 7 and 49, FIGS. 27 and 29, published by General Electric.
Custom Instruction Book No. 7VEYXO17IBO1, Instructions DC Adjustable Speed Drive, (1 page), General Electric.
GEK-85765C Errata Sheet No. 01, Oct. 1985, Instructions DC-300 Adjustable Speed Drives, (3 pages), General Electric.
Custom Software Description IB #EYXO17IBO1O1, General Electric.
Custom Software Description IB #PAXO18IBO1O1, General Electric.

*Primary Examiner*—William M. Shoop, Jr.
*Assistant Examiner*—Bentsu Ro
*Attorney, Agent, or Firm*—John M. Haurykiewicz

[57] ABSTRACT

A method for operating a DC motor controller according to a first gain when the armature current of the DC motor is discontinuous, according to a second gain when the armature current is continuous, and according to a third gain when the armature current is in transition from the discontinuous to continuous conduction. The gains have proportional and integral terms and the integral term in the discontinuous and transition regions varies inversely to a current reference in the controller.

17 Claims, 3 Drawing Figures

DC MOTOR ADAPTIVE CONTROLLER

BACKGROUND OF THE INVENTION

The field of this invention is phase-controlled DC motor regulators, particularly of the digital type, which use a power semiconductor section to provide variable amplitude armature current.

This invention relates to operation of DC motor controllers including those which utilize a microprocessor or other digital controller. An example of a microprocessor suitable for such application is an INTEL 8096 or 8097 microprocessor such as may be used in the practice of the invention in application Ser. No. 888,780 filed July 22, 1986, for a Digital Phase Synchronizer. Since that application provides a digital signal suitable for phase synchronization which may be utilized by a digital controller to provide phase firing information, it is expressly incorporated by reference herein.

In phase controlled DC motor regulator systems, it has been observed that there are two effective levels of gain in the power semiconductor output section corresponding, respectively, to the discontinuous and continuous current conduction regions. "Discontinuous current" refers to the condition where armature current starts from zero each time a power semiconductor is "fired" or turned on by the motor regulator. "Continuous current" refers to the condition or region of operation where armature current continues without interruption as successive phases are fired in the power semiconductor section. In the power semiconductor section, a relatively low gain region exists in the discontinuous region and a relatively high gain region exists in the continuous current region. Because of this, it has not heretofore been possible to optimize regulator gain over both the discontinuous and continuous conduction regions while at the same time adjusting the transition point between such regions. In addition, a significant nonlinearity within the discontinuous current conduction region has been an obstacle to obtaining optimum regulator performance.

BRIEF SUMMARY OF THE INVENTION

The present invention overcomes these aspects of prior art regulator systems by providing for different gains or transfer functions or characteristics in the discontinuous and continuous armature current conduction regions of operation while providing for an automatic adjustment of the transition point between such regions; in addition, the present invention provides for a still different gain characteristic for the transition point or region of moving from discontinuous to continuous armature current conduction. Furthermore, this invention provides for automatic compensation in the current regulator transfer function by providing a term inversely related to the current reference to optimize performance in the face of the nonlinearity present in the discontinuous current region of the power semiconductor gain characteristic.

DETAILED DESCRIPTION

Figure 1:
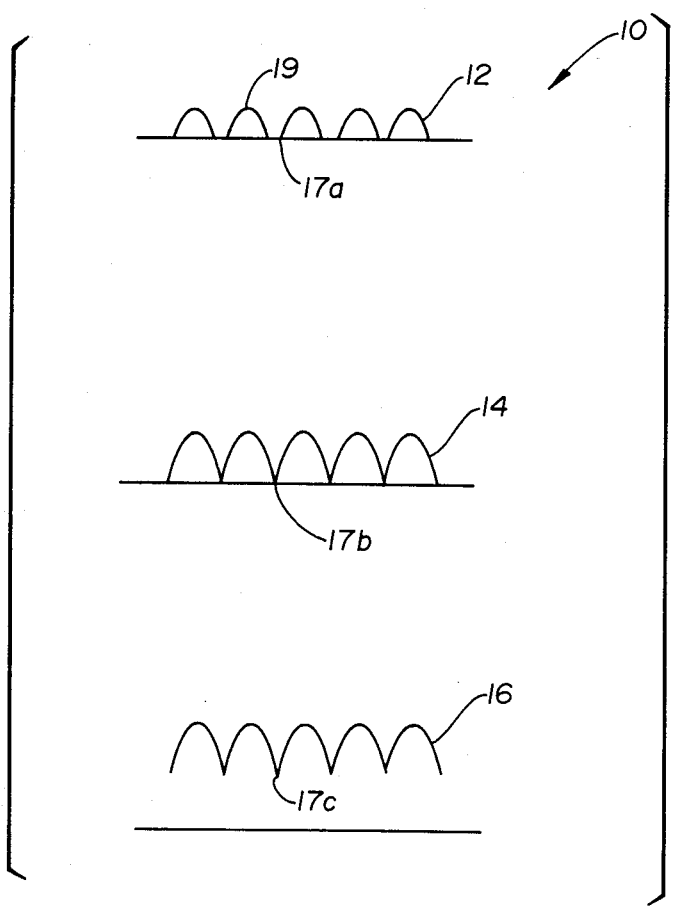
FIG. 1 shows armature current waveforms corresponding to the discontinuous, transition and continuous conduction regions of operation.

Referring to FIG. 1, representative waveforms of armature current 10 may be seen. Waveform 12 illustrates discontinuous current, waveform 14 illustrates armature current at the transition between discontinuous and continuous current, and waveform 16 illustrates armature current in continuous conduction from phase to phase.

The firing angle or point at which power semiconductors are turned on (normally by way of a gate control signal) is indicated at points 17a, b, c, respectively, for discontinuous, transition and continuous current.

Although of interest and usefulness in hybrid control systems having switched analog control transfer functions, this invention is particularly useful in the environment of digital control systems where it is possible to "anticipate" such firing angle conveniently. It has been found desirable to check for the presence or absence of armature current in advance of the firing angle for each phase about to be fired. Armature current will be zero at some point prior to the firing angle for discontinuous conduction but will be non-zero for continuous conduction. Instead of testing for zero, it has been found preferable to use a test or threshold level of 5% of rated motor current (in order to eliminate false signals due to noise) and furthermore it has been found preferable to check for armature current ten electrical degrees before the firing point. Such a ten degree advance has been found desirable to allow the digital processor sufficient time to perform the steps of this invention prior to the actual firing point in that phase. In the event that faster or slower digital controllers other than the INTEL 8097 microprocessor are used, it may be found advantageous to use fewer or greater electrical degrees in advance of the firing point in the practice of this invention.

Figure 2:
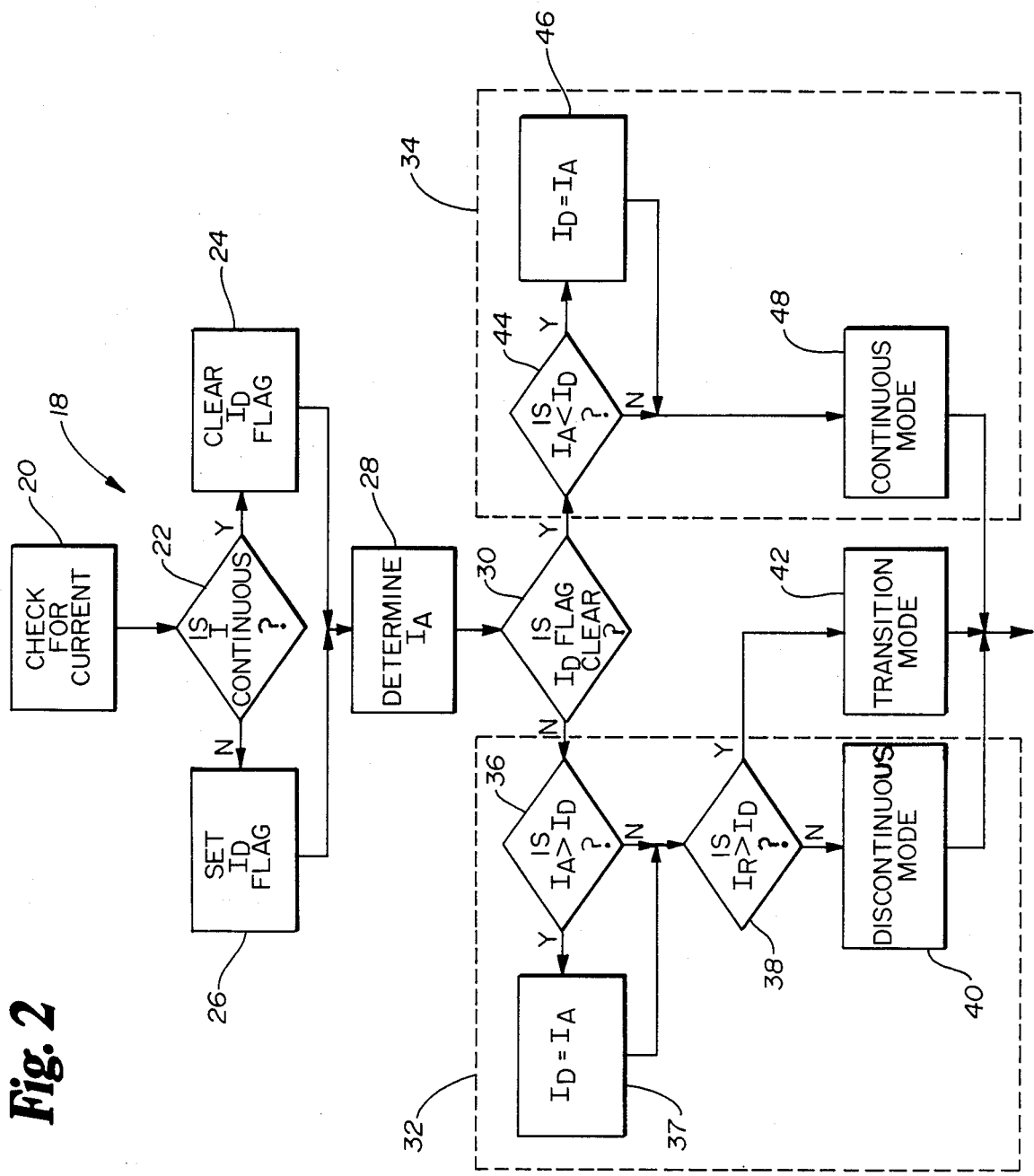
FIG. 2 is a block diagram of the present invention.

Referring now more particularly to FIG. 2, a block diagram 18 of the present invention may be seen.

In the practice of this invention, current is checked at block 22 in advance of the firing point of each phase or half cycle of the AC line to determine whether armature current is continuous or discontinuous. If the armature current is discontinuous, the $I_D$ (discontinuous current) flag is set at block 26. If armature current is continuous, the $I_D$ flag is cleared at block 24.

The digital regulator also measures or calculates an armature current signal $I_A$ representative of the average value of armature current at block 28. This calculation is performed by integrating waveform 19 of the armature current over its respective phase; it is not related to the current check at block 20. The average current signal, $I_A$, is preferably used by the digital processor as a feedback signal with a current reference, $I_R$, for current regulation purposes in a closed-loop current control.

The $I_D$ flag is sensed at block 30. If the $I_D$ flag is set, armature current is discontinuous, indicated by dashed block or subsystem 32. If the $I_D$ flag is clear, armature current is in continuous conduction, indicated by dashed block or subsystem 34.

Referring now more particularly to subsystem 32, average current, $I_A$, is compared at block 36 to $I_D$, the stored value of the highest discontinuous current previously sensed. If the average current is greater, the average value is retained, replacing the previously stored value at block 37. It is to be understood that it is the average value of the waveform 19 from the previous phase that is used in the comparison of block 36 which takes place immediately before firing point 17a of the present phase.

As the steps of system 18 are performed for each phase fired in the power semiconductor section, the system 18 will learn (through repetitive sequencing through blocks 36 and 38) the highest value obtainable by the drive for discontinuous armature current. In the event that the average current is less than the stored value of the highest discontinuous current previously sensed, the stored value will not be replaced with the average current but will be retained for the next comparison.

The highest sensed discontinuous current will be compared to the current reference, $I_R$, at block 38. Under steady state conditions, the highest value for discontinuous current stored will be equal to the current reference presently called for by the current regulator, and the drive will operate in the discontinuous mode as indicated at block 40. In the event that the current reference is greater than the highest value stored for discontinuous current, the drive will determine that it is in a transient state of increasing current leading to continuous conduction and will operate in the transition mode indicated at block 42 in anticipation of entering continuous current.

It has been found preferable to initialize $I_D$ to a value close to the expected highest discontinuous current to minimize the time in the transient mode while the drive "learns" the transition point for the first time.

When continuous armature current is sensed at block 22, the $I_D$ flat is cleared and average current, $I_A$, is compared to the highest previously stored discontinuous current, $I_D$, at block 44. If $I_A$ is less than $I_D$, the previously stored value $I_D$ is replaced with the present average value $I_A$ at block 46. This permits the drive system 18 to learn and retain a new highest discontinuous current level in the event that such level decreases, as will occur with higher CEMF values reached in motor operation. The drive will now operate in the continuous current conduction mode as indicated by block 48.

Because of the differing gains in the power semiconductor section in the continuous and discontinuous current transfer regions, it has been found desirable to operate the regulator according to different gain levels or transfer function characteristics in the regions or modes 40 and 48 for discontinuous and continuous current conduction. Furthermore, to provide for optimum operation in the transition mode 42 from discontinuous to continuous current conduction, a still different gain level is utilized. As is known, it is desirable to utilize combined proportional and integral type transfer functions for the current control loop regulator environment of the present invention. With the present invention, each of the proportional and integral terms of the overall regulator gain of the current control loop may be independently selected in each current region or mode to optimize system performance. Table 1 shows values which have been found to be desirable in a particular application, and are given by way of example to indicate the relative changes between the various modes.

TABLE 1

| MODE | GAIN | |
|---|---|---|
| | Proportional | Integral |
| Discontinuous | 5 | 3700/$I_R$ |
| Transition | 5 | 2220/$I_R$ |

TABLE 1-continued

| MODE | GAIN | |
|---|---|---|
| | Proportional | Integral |
| Continuous | 132 | 10 |

The most significant portion of the gain change is in the integral term. In the discontinuous and transition modes, the integral gain is an inverse function of the current reference $I_R$. In this particular application, the range of the integral gain in the discontinuous mode has been found to be desirably limited to 740 to 7.2. The integral gain term in the transition mode has been found to be desirably 0.6 times the value in the discontinuous mode. The proportional gain term in the continuous mode has been found desirably selected to correspond to the particular motor and load in a given application, with a typical range for this value between 25 and 1,000. The integral gain term is made a function of the current reference to compensate for non-linearity of the gain in the power semiconductor section. It is to be understood that the values in table 1 correspond to proportional and integral coefficients in a transfer function for the current regulator overall gain and other values may be selected to optimize operation in a particular application. It is to be further understood that the transition mode 42 has been found to be desirable to avoid large overshoot in the current response when the system 18 is in the discontinuous armature current mode and the current reference is calling for a large increase in armature current.

By sensing the updating where the transition from discontinuous to continuous current takes place (and vice versa), it is possible to optimize the gain of the current regulator control loop independently in the discontinuous and continuous current operating regions. This enables the system to achieve overall higher performance without a corresponding sacrifice in control loop stability.

Figure 3:
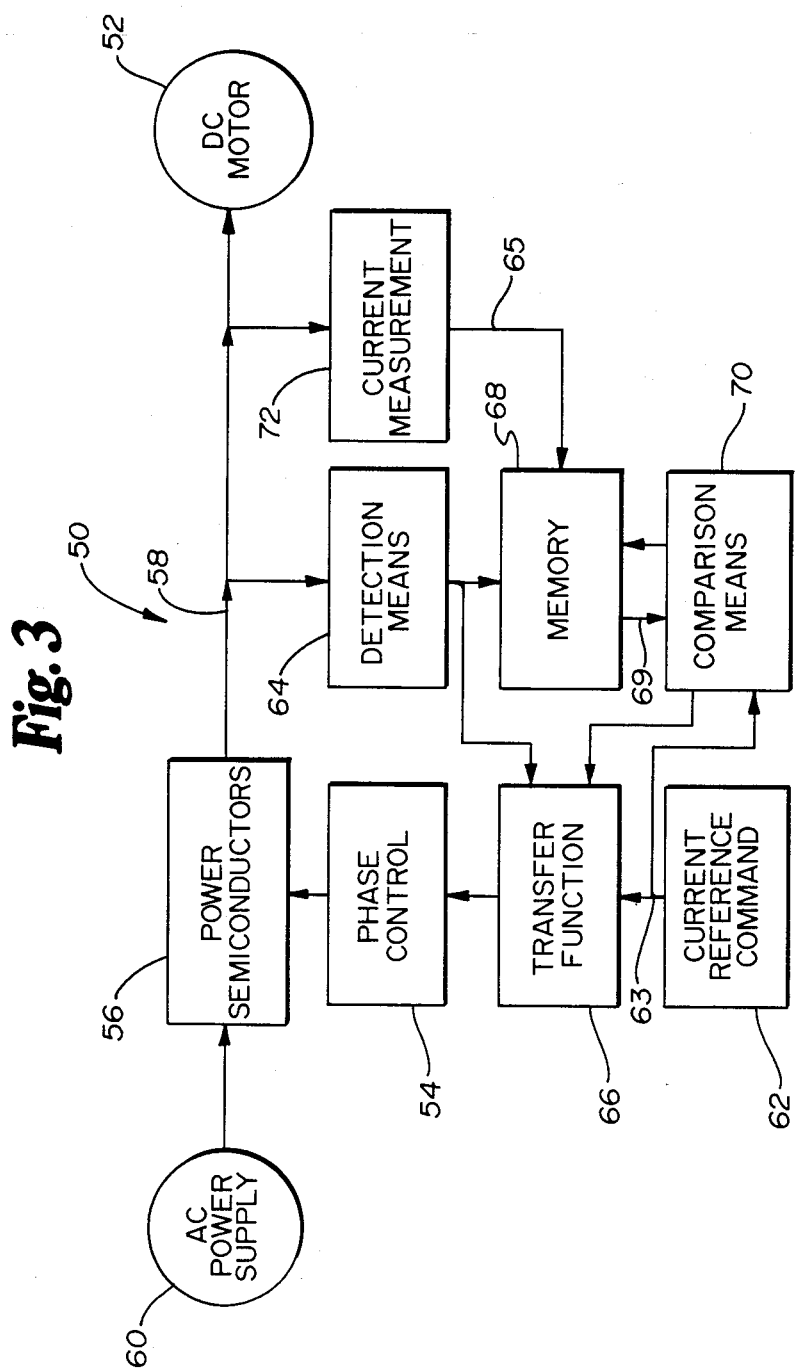
FIG. 3 is another block diagram showing further features of the present invention.

Referring now to FIG. 3, a regulator 50 for a DC motor 52 may be seen. Regulator 50 has a phase control 54 for power semiconductors 56 to provide armature current 58 from an AC power supply 60 in response to a current reference command 62. Regulator 50 also has a detection means 64 for detecting whether armature current 58 is continuous or discontinuous, and a transfer function means 66 for regulating armature current 58 according to a first transfer function characteristic having at least an integral gain term varying inversely to the current reference command 62 while the armature current 58 is discontinuous.

The transfer function means 66 further regulates armature current 58 according to a second transfer function characteristic while the armature current 58 is continuous.

Regulator 50 also has a current measuring means 72 for providing an armature current signal 65. Regulator 50 further has a memory 68 for retaining the highest armature current signal measured while armature current 58 is discontinuous, and a comparison means 70 for determining whether the current reference command 62 is greater than the retained armature current signal 69. The transfer function means 66 further regulates the armature current 58 according to a third transfer function characteristic while the armature current 58 is discontinuous and the comparison means 70 determines that the current reference command 62 is greater than the retained armature current signal 69. The memory means 68 further retains the lowest armature current signal measured while the armature current 58 is continuous.

More particularly, regulator 50 operates DC motor 52 through phase-control 54 by determining whether motor armature current 58 is continuous from phase to phase by sampling the armature current 58 a predetermined number of degrees ahead of the firing command in each phase; computing an average value of armature current; comparing the average value of armature current to a stored value representative of the highest previously sensed discontinuous armature current; retaining as the "retained value" the higher of the average value of armature current and the stored value of the highest previously sensed discontinuous armature current when armature current is discontinuous and retaining the lower of the average value and the stored value of the highest previously sensed discontinuous armature current when the armature current is continuous.

The retained value is compared to a current reference signal 63 when the armature current 58 is discontinuous.

Regulator 50 operates at (i) a first gain characteristic when the armature current 58 is discontinuous and the current reference signal 63 is less than the retained value, (ii) a second gain characteristic when the armature current 58 is continuous, and (iii) a third gain characteristic when the armature 8 is discontinuous and the current reference 63 is greater than the retained value.

It is to be understood that the first, second and third gain characteristics each comprise proportional and integral type gain terms. Preferably, and as is shown in Table 1, the integral term in the first gain characteristic (corresponding to the discontinuous mode) is an inverse function of the current reference signal 63; the integral term is reduced in the second gain characteristic (corresponding to the continuous mode) relative to the first gain characteristic, and the integral term in the third gain characteristic (corresponding to the transition mode) is intermediate the integral terms of the first and second gain characteristics. Finally it may be noted that the integral term in the third gain characteristic is also preferably an inverse function of the current reference signal 63.

The invention is not to be taken as limited to all of the details thereof as modifications and variations thereof may be made without departing from the spirit or scope of the invention; accordingly what is claimed is:

1. In a method of regulating DC motors of the type providing armature current through phase control of power semiconductors, the improvement comprising the steps of:
    (a) repetitively sensing and storing the highest value of armature current while in discontinuous conduction as a transition value between discontinuous and continuous armature current conduction; and
    (b) regulating said armature current to a presently commanded value by operating at a first gain while said armature current is below said transition value, and at a second gain while said armature current is above said transition value.

2. The method of claim 1 wherein said first gain further comprises an integral gain transfer function having a coefficient varying inversely to the presently commanded value for armature current.

3. The method of claim 1 wherein step (a) further comprises the substeps of:

($a_i$) checking for discontinuous conduction of armature current prior to the firing point of the power semiconductors,
    ($a_{ii}$) comparing the presently sensed value of armature current to the previously stored highest value of discontinuous armature current, and
    ($a_{iii}$) in the event of discontinuous conduction of armature current as determined in substep ($a_i$), storing the higher of the presently sensed and previously stored values of armature current as representative of said transition level.

4. The method of claim 3 further comprising the additional steps of:
    (c) comparing the value in storage after substep ($a_{iii}$) with the presently commanded value for armature current; and
    (d) regulating said armature current at a third gain when said presently commanded value for armature current is greater than the value in storage after substep ($a_{iii}$).

5. The improvement of claim 4 further comprising the step of:
    (e) repetitively sensing and storing the lowest value of armature current while in continuous conduction as the transition value.

6. The method of claim 5 wherein step (e) further comprises the substeps of:
    ($e_i$) comparing the presently sensed value of armature current to the previously stored highest value of discontinuous armature current, and
    ($e_{ii}$) in the event of continuous conduction of armature current as determined in substep ($a_i$), storing the lower of the presently sensed and previously stored values of armature current as representative of said transition level.

7. The method of claim 4 wherein said third gain further comprises an integral gain characteristic.

8. In a regulator for DC motors of the type having closed-loop phase control of power semiconductors to provide armature current from an AC power supply in response to a current reference command, the improvement comprising:
    (a) means for detecting whether armature current is continuous or discontinuous; and
    (b) transfer function means for regulating armature current according to a first transfer function characteristic having at least an integral gain term varying inversely to the current reference command while said armature current is discontinuous.

9. The improvement of claim 8 wherein said transfer function means further comprises means for regulating armature current according to a second transfer function characteristic while said armature current is continuous.

10. The improvement of claim 9 further comprising:
    (c) current measuring means for providing an armature current signal;
    (d) memory means for retaining the highest armature current signal measured while said armature current is discontinuous; and
    (e) comparison means for determining whether the current reference command is greater than the retained armature current signal;
    wherein said transfer function means further regulates said armature current according to a third transfer function characteristic while said armature current is discontinuous and said comparison means determines that the current reference command is greater than the retained armature current signal.

11. The improvement of claim 10 wherein said memory means further comprises means for retaining the lowest armature current signal measured while said armature current is continuous.

12. A method of operating a DC motor phase-control regulator comprising:
   (a) determining whether motor armature current is continuous from phase to phase by sampling said armature current a predetermined number of degrees ahead of the firing command in each phase;
   (b) computing an average value of said armature current;
   (c) comparing said average value of armature current to a stored value representative of the highest previously sensed discontinuous armature current;
   (d) retaining the higher of said average value of armature current and said stored value of the highest previously sensed discontinuous armature current when said armature current is discontinuous and retaining the lower of said average value and said stored value of the highest previously sensed discontinuous armature current when said armature current is continuous;
   (e) comparing said retained value from step (d) to a current reference signal when said current is discontinuous;
   (f) operating said regulator at:
      (i) a first gain characteristic when said armature current is discontinuous and said current reference signal is less than said retained value from step (d),
      (ii) a second gain characteristic when said armature current is continuous, and
      (iii) a third gain characteristic when said armature current is discontinuous and said current reference is greater than said retained value from step (d).

13. The method of claim 12 wherein said first, second and third gain characteristics each comprise proportional and integral type gain terms.

14. The method of claim 13 wherein the integral term in said first gain characteristic is an inverse function of said current reference signal.

15. The method of claim 13 wherein the integral term is reduced in said second gain characteristic relative to said first gain characteristic.

16. The method of claim 14 wherein the integral term in said third gain characteristic is intermediate the integral terms of said first and second gain characteristics.

17. The method of claim 16 wherein the integral term in said third gain characteristic is an inverse function of said current reference signal.

* * * * *